US010189456B2

(12) United States Patent
Foitzik et al.

(10) Patent No.: US 10,189,456 B2
(45) Date of Patent: Jan. 29, 2019

(54) VEHICLE BRAKE SYSTEM AND METHOD OF OPERATING

(71) Applicant: Robert Bosch GmbH, Stuttgart (DE)

(72) Inventors: Bertram Foitzik, Ilsfeld (DE); Hsien-cheng Wu, Novi, MI (US); Wenguang Zhou, Novi, MI (US)

(73) Assignee: Robert Bosch GmbH, Stuttgart (DE)

( * ) Notice: Subject to any disclaimer, the term of this patent is extended or adjusted under 35 U.S.C. 154(b) by 42 days.

(21) Appl. No.: 15/391,403

(22) Filed: Dec. 27, 2016

(65) Prior Publication Data

US 2018/0178772 A1 Jun. 28, 2018

(51) Int. Cl.
*B60T 7/04* (2006.01)
*B60T 8/00* (2006.01)
*B60T 8/40* (2006.01)
*B60T 11/16* (2006.01)
*B60T 13/14* (2006.01)
(Continued)

(52) U.S. Cl.
CPC ............ *B60T 13/745* (2013.01); *B60T 7/042* (2013.01); *B60T 8/00* (2013.01); *B60T 8/4081* (2013.01); *B60T 13/146* (2013.01); *B60T 13/662* (2013.01); *B60T 13/686* (2013.01);
(Continued)

(58) Field of Classification Search
CPC ...... B60T 13/745; B60T 7/042; B60T 8/4081; B60T 13/14; B60T 13/686; B60T 13/142; B60T 13/588; B60T 13/66; B60T 11/16; B60T 13/146; B60T 13/662; B60T 17/221; B60T 8/00; B60T 2270/82; B60T 2270/404

USPC ........ 303/15, 9.63, 113.4, 114.1, 115.2, 122, 303/122.04, 122.05; 701/70, 76, 92, 97
See application file for complete search history.

(56) References Cited

U.S. PATENT DOCUMENTS

| 6,837,552 B2 | 1/2005 | Reuter et al. |
| 7,267,411 B2 | 9/2007 | Nishikawa et al. |

(Continued)

FOREIGN PATENT DOCUMENTS

| CN | 1757551 A | 4/2006 |
| GB | 2349676 A | 11/2000 |

(Continued)

*Primary Examiner* — Pamela Rodriguez
(74) *Attorney, Agent, or Firm* — Michael Best & Friedrich LLP

(57) ABSTRACT

A brake system comprises a master cylinder, a first brake cylinder, a second brake cylinder, an electronically-controlled pressure generating unit distinct from the master cylinder, a first hydraulic circuit in selective fluid communication with the master cylinder and the first brake cylinder, a second hydraulic circuit in selective fluid communication with the master cylinder and the second brake cylinder, and a controller. In a first mode, the controller is operable to actuate the electronically-controlled pressure generating unit to deliver hydraulic fluid pressure to the first brake cylinder and the second brake cylinder proportional to an input. In a second mode, the controller is operable to actuate the electronically-controlled pressure generating unit to deliver hydraulic fluid pressure to the first hydraulic circuit and the first brake cylinder and the master cylinder is in communication with the second hydraulic circuit to deliver hydraulic fluid pressure to the second brake cylinder.

17 Claims, 5 Drawing Sheets

(51) Int. Cl.
  *B60T 13/66* (2006.01)
  *B60T 13/68* (2006.01)
  *B60T 13/74* (2006.01)
  *B60T 17/22* (2006.01)

(52) U.S. Cl.
  CPC ............. *B60T 17/221* (2013.01); *B60T 11/16* (2013.01); *B60T 2270/404* (2013.01); *B60T 2270/82* (2013.01)

(56) References Cited

U.S. PATENT DOCUMENTS

| | | | |
|---|---|---|---|
| 8,231,181 | B2 | 7/2012 | Hatano |
| 8,328,298 | B2 | 12/2012 | Yang et al. |
| 8,371,661 | B2 | 2/2013 | Leiber et al. |
| 8,838,354 | B2 | 9/2014 | Hartmann et al. |
| 8,851,579 | B2 | 10/2014 | Ohkubo et al. |
| 9,308,905 | B2 | 4/2016 | Biller et al. |
| 2004/0100146 | A1 | 5/2004 | Giers et al. |
| 2012/0169112 | A1 | 7/2012 | Jungbecker et al. |
| 2014/0028084 | A1* | 1/2014 | Biller ............... B60T 8/4081 303/9.62 |
| 2014/0152085 | A1* | 6/2014 | Biller ............... B60T 8/4081 303/10 |
| 2014/0225425 | A1* | 8/2014 | Drumm ............ B60T 7/042 303/9.75 |
| 2015/0035353 | A1* | 2/2015 | Drumm ............ B60T 8/3655 303/15 |
| 2015/0197229 | A1* | 7/2015 | Knechtges ........ B60T 8/4077 303/3 |

FOREIGN PATENT DOCUMENTS

| | | |
|---|---|---|
| WO | 2011105405 A1 | 9/2011 |
| WO | 2014135370 A1 | 9/2014 |

* cited by examiner

VEHICLE BRAKE SYSTEM AND METHOD OF OPERATING

BACKGROUND

The present invention relates to vehicles and vehicle braking systems.

Conventional brake-by-wire braking systems normally utilize electrically powered systems to effect vehicle braking at brake cylinders. Such braking systems often include a mechanical back-up in which the master cylinder produces a limited deceleration potential dependent upon the physical configuration of the master cylinder.

SUMMARY

In one aspect, the invention provides a vehicle brake system. The brake system comprises a master cylinder, a first brake cylinder, a second brake cylinder, an electronically-controlled pressure generating unit distinct from the master cylinder, a first hydraulic circuit in selective fluid communication with the master cylinder and the first brake cylinder, a second hydraulic circuit in selective fluid communication with the master cylinder and the second brake cylinder, and a controller operable to receive an input. In a first mode, the controller is operable to actuate the electronically-controlled pressure generating unit to deliver hydraulic fluid pressure to the first brake cylinder and the second brake cylinder proportional to the input. In a second mode, the controller is operable to actuate the electronically-controlled pressure generating unit to deliver hydraulic fluid pressure to the first hydraulic circuit and the first brake cylinder and the master cylinder is in communication with the second hydraulic circuit to deliver hydraulic fluid pressure to the second brake cylinder.

In another aspect, the invention provides a method of operating a vehicle brake system. The vehicle includes a plurality of brake cylinders. The vehicle brake system is operated in a primary brake-by-wire mode in which a hydraulic pressure is applied to the plurality of brake cylinders via an electronically-controlled pressure generating unit in response to depression of a brake pedal. A controller identifies that the vehicle brake system is inoperable in the primary brake-by-wire mode. Subsequent to identifying that the vehicle brake system is inoperable in the primary brake-by-wire mode, when the brake pedal is depressed, the electronically-controlled pressure generating unit is actuated via the controller to provide a first hydraulic pressure to a first brake cylinder of the plurality of brake cylinders while a fluid path between the electronically-controlled pressure generating unit and a second brake cylinder of the plurality of brake cylinders is closed. A fluid path is opened between a master cylinder and the second brake cylinder, thereby providing a second hydraulic pressure to the second brake cylinder.

In another aspect, the invention provides a vehicle brake system. The brake system comprises a first brake cylinder provided at a first vehicle axle, a second brake cylinder provided at a second vehicle axle, an electronically-controlled pressure generating unit operable to selectively provide pressurized fluid to the first and second brake cylinders, a master cylinder operable to pressurize fluid in response to an input force, a pedal feel simulator operable to provide a reaction force in response to the input force, and a controller operable to identify an input and transition the vehicle brake system from a brake-by-wire configuration to a back-up configuration in response to the input. In the brake-by-wire configuration, the electronically-controlled pressure generating unit provides pressurized fluid to the first and second brake cylinders, and the master cylinder provides pressurized fluid to the pedal feel simulator. In the back-up configuration, the electronically-controlled pressure generating unit provides pressurized fluid to the first brake cylinder, and the master cylinder provides pressurized fluid to the second brake cylinder.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
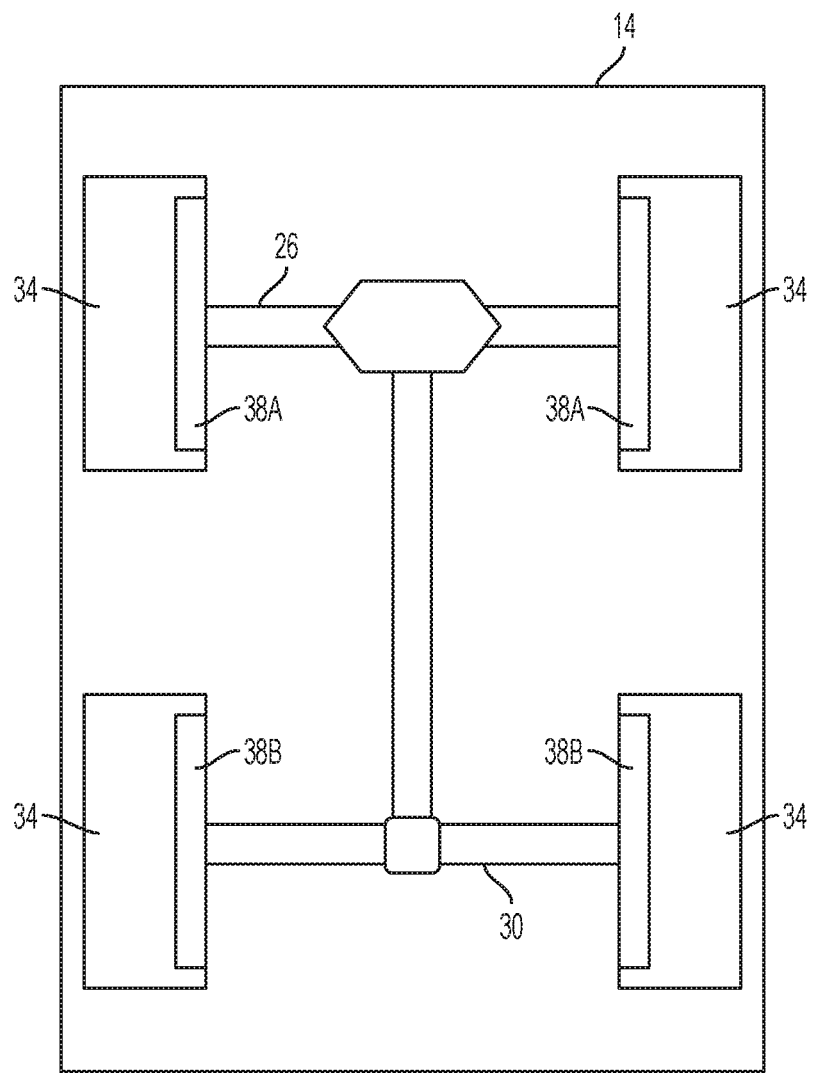
FIG. 1 is a schematic representation of a vehicle with two axles.
Figure 2:
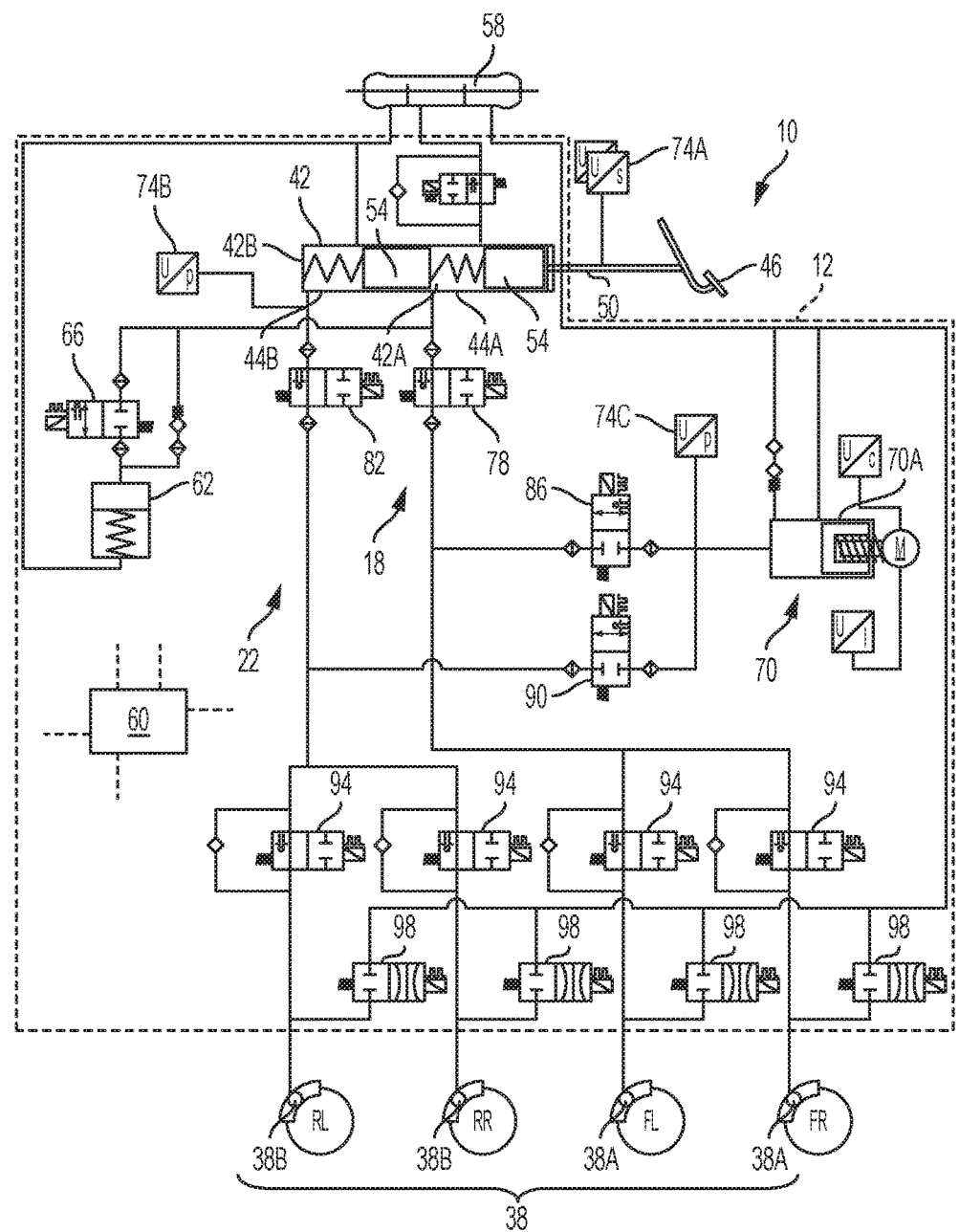
FIG. 2 schematically illustrates a brake system of the vehicle of FIG. 1.

FIGS. 1-2 illustrate a vehicle 14 including a brake system 10. The brake system 10 is an integrated power braking system that incorporates a tandem master cylinder 42, a pedal feel simulator 62, an electronically-controlled pressure generating unit 70, and a group of valves (e.g., isolation and control valves 78, 82, 86, 90) into a single housing 12. Further, no booster is located between the tandem master cylinder 42 and a brake pedal 46 coupled to provide an input to the tandem master cylinder 42.

The brake system 10 includes two hydraulic circuits 18, 22, including a first hydraulic circuit 18 providing braking to a front axle 26 of the vehicle 14, and a second hydraulic circuit 22 providing braking to a rear axle 30. Alternatively, the first and second hydraulic circuits 18, 22 may provide braking to the rear and front axles 30, 26, respectively. It is to be understood that each one of the front axle 26 and the rear axle 30 may be defined by multiple components.

As shown in FIG. 1 in the context of a four-wheeled vehicle, each axle 26, 30 may rotate with two wheels 34. Alternatively, each axle 26, 30 may rotate with only a single wheel 34 or more than two wheels 34. The axles 26, 30 define individual positions spaced apart in a direction of travel of the vehicle 14. A brake cylinder 38 is located at each wheel 34 and may, for example, actuate a caliper to squeeze a brake disc that is rotatable with the associated wheel 34. The first hydraulic circuit 18 provides hydraulic brake fluid to a first subset 38A of the brake cylinders 38 and the second hydraulic circuit 22 provides hydraulic brake fluid to a second subset 38B of the brake cylinders 38. As shown in FIG. 2, each subset 38A, 38B includes two brake cylinders 38.

As shown in FIG. 2, a tandem master cylinder 42 is located upstream of the hydraulic circuits 18, 22 and receives a user input force via the brake pedal 46. The tandem master cylinder 42 converts the input force into hydraulic pressure within first and second master cylinder chambers 42A, 42B to produce increased hydraulic pressure within the hydraulic circuits 18, 22, respectively. More specifically, the brake pedal 46 translates a pushrod 50 and plungers 54 within the tandem master cylinder 42 to move fluid in the chambers 42A, 42B into the hydraulic circuits 18, 22 via master cylinder outlets 44A, 44B, respectively. When un-actuated, the tandem master cylinder 42 is in communication with a reservoir 58, such that the pressure within the chambers 42A, 42B is at reservoir pressure (e.g., atmospheric pressure).

The first and second circuits 18, 22 are provided with master cylinder isolation valves 78, 82, respectively. The master cylinder isolation valves 78, 82 are two-position valves, operable to transition between an open position and a closed position. Alternatively, the valves 78, 82 may be proportional valves (e.g., controlled via pulse-width modulation) such that they provide a variable flow opening ranging from a closed position to a fully open position, including a plurality of intermediate positions therebetween. When the valves 78, 82 are in the closed position, the fluid from the master cylinder chambers 42A, 42B cannot reach the brake cylinders 38 and is therefore directed towards a pedal feel simulator 62.

The pedal feel simulator 62 is located downstream of the tandem master cylinder 42 and is fluidly connected to the first circuit 18. A pedal feel simulator control valve 66 is positioned between the pedal feel simulator 62 and the tandem master cylinder 42 to selectively open or close the fluid path between the same. When in fluid communication with the tandem master cylinder 42, the pedal feel simulator 62 provides a reaction force at the brake pedal 46 in response to the force provided by the pressurized hydraulic fluid to mimic the reaction force otherwise provided when the tandem master cylinder 42 communicates directly with the brake cylinders 38.

The brake system 10 further includes an electronically-controlled pressure generating unit 70 separate from the tandem master cylinder 42. The pressure generating unit 70 provides a braking force to the brake cylinders 38 when the master cylinder isolation valves 78, 80 are in the closed position and may be mechanical, hydraulic, or mechatronic. The electronically-controlled pressure generating unit 70 has a greater fluid storage volume than the master cylinder 42 such that actuation of the pressure generating unit 70 is capable of displacing more fluid than the master cylinder 42. As shown, the pressure generating unit 70 is a motor-driven piston 70A. Alternatively, the pressure generating unit 70 may be, for example, a hydraulic accumulator or a pump. The pressure generating unit 70 produces a hydraulic pressure or output force proportional to a sensed input value. The input value may be the travel distance of the brake pedal 46 or pushrod 50, the input force provided by the user at the brake pedal 46, or the fluid pressure from the tandem master cylinder 42. Accordingly, various sensors (e.g., pedal force or travel sensor 74A, master cylinder pressure sensor 74B) measure the input value and relay the value to a controller 60. The pedal sensor 74A and the master cylinder pressure sensor 74B may be located on independent electrical circuits such that one may function as a back-up to the other. Collectively, the pedal sensor 74A and the master cylinder pressure sensor 74B can detect hard pedal issues based on a relationship between the measured fluid pressure and the force applied to or travel of the pedal 46. In turn, the pressure generating unit 70 is operated by the controller 60 to pressurize hydraulic fluid within the hydraulic circuits 18, 22 in proportion to the sensed input value.

The first and second circuits 18, 22 are further provided with pressure generating unit control valves 86, 90, respectively. The pressure generating control valves 86, 90 are two-position valves, operable to transition between an open position and a closed position. Alternatively, the valves 86, 90 may be proportional valves (e.g., controlled via pulse-width modulation) such that they provide a variable flow opening ranging from a closed position to a fully open position, including a plurality of intermediate positions therebetween. If the valves 86, 90 are in the closed position, the fluid from the pressure generating unit 70 cannot reach the brake cylinders 38.

Additional valves control the flow to and from each brake cylinder 38. Inlet valves 94 are proportional valves such that they provide a variable flow opening ranging from a closed position to a fully open position, including a plurality of intermediate positions therebetween to regulate the braking force at each brake cylinder 38 independently. Outlet valves 98 include a restrictive opening for selectively returning fluid from the brake cylinders 38 to the reservoir 58 and may, for example, assist with traction control.

Figure 3:
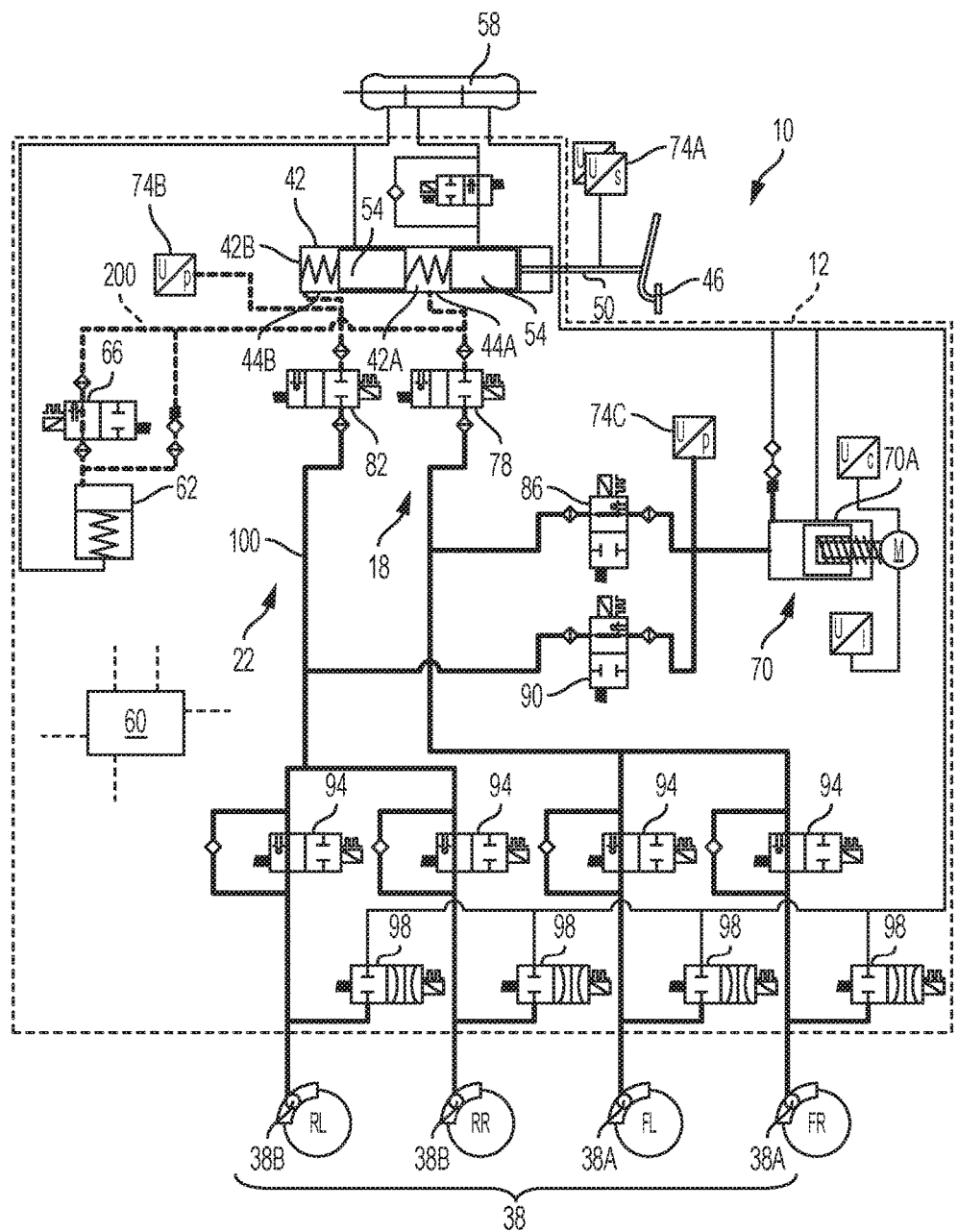
FIG. 3 schematically illustrates the vehicle brake system operating in a first mode.

The brake system 10 is operable in a primary mode for normal brake-by-wire operation. In the primary mode, the electronically-controlled pressure generating unit 70 provides a braking force to all of the brake cylinders 38, including those in the first and second subsets 38A, 38B of brake cylinders 38. The braking force is provided in proportion to a driver's request in the normal operation, where the tandem master cylinder 42 is isolated from the brake cylinders 38 by the isolation valves 78, 82. Such braking is illustrated in FIG. 3, with the pressurized fluid from the pressure generating unit 70 illustrated with bolded lines 100 and the pressurized fluid from the tandem master cylinder 42 illustrated with bolded and dashed lines 200.

In the primary mode, the user provides an input to the brake pedal 46, which translates the pushrod 50 and plunger 54, thereby moving fluid to the hydraulic circuits 18, 22. The pedal feel simulator control valve 66 is an open position. Therefore, as indicated by line 200, the fluid pressure supplied by the tandem master cylinder 42 is provided to the pedal feel simulator 62.

Figure 5:
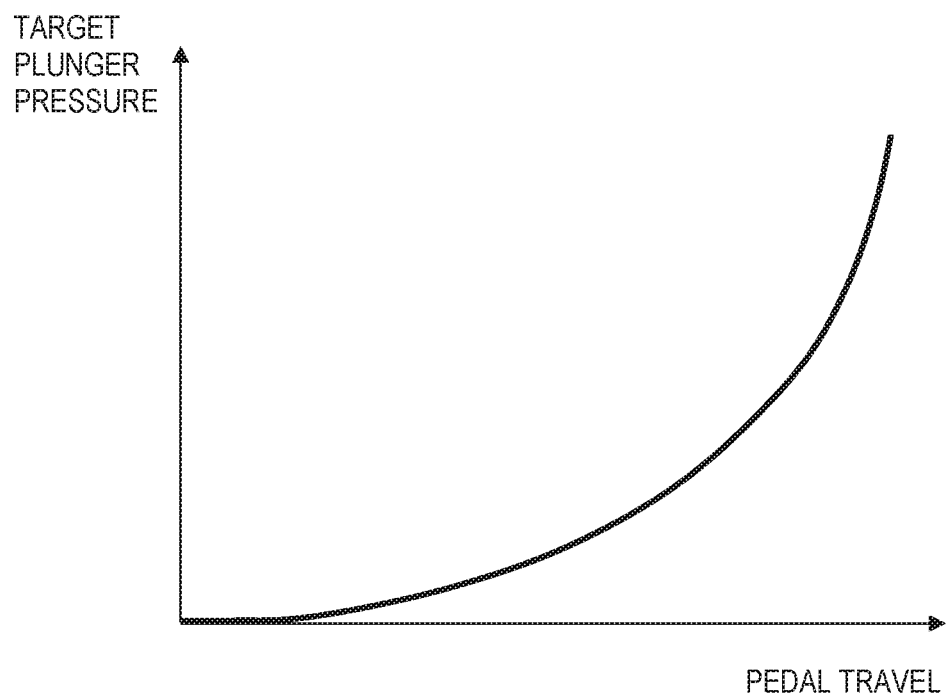
FIG. 5 is a graph illustrating a relationship between pedal travel and target piston pressure.

Concurrently, the pressure generating unit 70 is actuated by an output signal from the controller 60, in response to an output signal corresponding to the sensed value indicative of and proportional to the user input. The pedal travel (i.e., displacement of the brake pedal) is measured by the pedal travel sensor 74A and is transformed to a target piston pressure via the controller 60. The target piston pressure is associated with a specific pedal travel, for example, as shown in the graph of FIG. 5. The controller 60 converts the target piston pressure to a target motor speed and actuates a motor M (e.g., a three-phase brushless DC motor) to achieve the target motor speed. The target motor speed is variable and is adjusted with respect to time to accomplish an overall desired piston position capable of providing the target piston pressure. The piston 70A is driven by the motor M to produce increased hydraulic pressure at the brake cylinders 38 corresponding to the target piston pressure. Further, a pressure sensor 74C may measure the actual pressure of the hydraulic fluid (indicated by line 100) from the pressure generating unit 70 and provide a signal indicative of the measured pressure or indicative of an estimated brake cylinder pressure to the controller 60. The controller 60 may then compare the pressure measured by the sensor 74C to the target piston pressure. The pressure generating unit 70 may then increase or decrease the produced fluid pressure until the pressure measured by the sensor 74C matches the target piston pressure. The target piston pressure may be updated to reflect changes in the user input.

In the primary mode, the pressure generating unit control valves 86, 90 are actuated to open positions. Therefore, as indicated by line 100 in FIG. 3, the fluid pressure supplied by the pressure generating unit 70 is introduced into both the first hydraulic circuit 18 and the second hydraulic circuit 22 and is provided to the brake cylinders 38 corresponding with each. Therefore, in the primary mode, a hydraulic pressure from the pressure generating unit 70 is applied to all of the brake cylinders 38 (i.e., at both axles 26, 30). The allowable flow rate through the control valves 86, 90 may be adjusted by the controller 60 to vary the pressure between the first and second brake circuits 18, 22 and vary the braking force between the first and second subsets of brake cylinders 38A, 38B (e.g., if the control valves 86, 90 are proportional valves). Alternatively, the inlet valves 94 may be adjusted by the controller 60 to vary the pressure at each brake cylinder 38. Therefore, the braking forces can vary between front and rear brake cylinders 38 or at each cylinder 38 individually. Alternatively, the fluid pressure within the first circuit 18 may be equal to the pressure within the second circuit 22.

Once a user removes pressure from the brake pedal 46 (e.g., removes foot from the brake pedal), the controller 60 instructs the piston 70A to return to an un-actuated state and the fluid returns to the pressure generating unit 70 via the open control valves 86, 90. The control valves 86, 90 are then returned to the closed position once fluid pressures are equalized.

The braking system 10 may transition from the primary mode to the back-up or secondary mode in response to a failure or malfunction of a component, such as one of the sensors 74A-74C, the simulator 62, or the simulator valve 66. For example, a failure of the simulator 62 or simulator valve 66 may prevent a proper pedal stroke, which may be identified by the controller 60 based on an increased pressure unassociated with an increased pedal travel. In response, the controller 60 sends a signal to transition the braking system 10 from the primary mode to the back-up mode.

Rather than cease operation of the pressure generating unit 70 and rely on mechanical back-up solely from the tandem master cylinder 42, the secondary mode provides a combined braking force from the tandem master cylinder 42 and the pressure generating unit 70. In the secondary mode, the user provides an input to the brake pedal 46, which translates the pushrod 50 and plunger 54. The first master cylinder isolation valve 78 is closed, yet the second master cylinder isolation valve 82 is open. Therefore, the fluid pressure from the tandem master cylinder 42 (as indicated by bolded and dashed lines 200 in FIG. 4) is transferred to the second subset of brake cylinders 38B (e.g., of the rear axle 30). The pedal feel simulator control valve 66 is in the closed position so that fluid is not supplied from the tandem master cylinder 42 to the simulator 62, but only to the second subset of brake cylinders 38B Concurrently during the second mode, the pressure generating unit 70 is actuated in response to a sensed value and dependent upon the input to the brake pedal 46 (i.e., dependent upon input force and/or input stroke). The first pressure generating unit control valve 86 is in the open position and the second pressure generating unit control valve 90 is in the closed position. Therefore, as indicated by the bolded lines 100 in FIG. 4, the fluid pressure supplied by the pressure generating unit 70 is introduced only to the first subset of brake cylinders 38A (e.g., of the front axle 26). Therefore, in the secondary mode, the first subset of brake cylinders 38A receives a hydraulic pressure from the pressure generating unit 70 to generate a braking force and the second subset of brake cylinders 38B receives a hydraulic pressure from the tandem master cylinder 42 to generate a braking force.

Once a user removes pressure from the brake pedal 46, the tandem master cylinder 42 return to un-actuated states and the controller 60 returns the piston 70A to an un-actuated state. The fluid in the first circuit 18 returns to the pressure generating unit 70 via the open control valve 86 and the fluid in the second circuit 22 returns to the tandem master cylinder 42 via the open isolation valve 82.

Prior to braking in the secondary mode, the braking system 10 may be actuated in the primary mode of braking wherein hydraulic pressure is provided to all of the plurality of brake cylinders 38 from the pressure generating unit 70. If the controller 60 detects a failure (e.g., a missing signal from a sensor, a measurement outside a predetermined range, etc.), the braking system 10 is instructed by the controller 60 to transition operation to the secondary mode. Entering the back-up secondary mode, a fluid path is closed between the pressure generating unit 70 and a subset of the plurality of brake cylinders 38B. A fluid path is also closed between the tandem master cylinder 42 and the pedal feel simulator 62. Further, a fluid path is opened between the tandem master cylinder 42 and the subset of brake cylinders 38B, thereby providing a first hydraulic pressure to the subset of brake cylinders 38B from the force applied to the brake pedal 46. The pressure generating unit 70 is actuated to provide a second hydraulic pressure to another subset of the plurality of brakes 38A. The first and second hydraulic pressures are applied concurrently to provide a deceleration rate greater than that of mechanical back-up alone (i.e., relying only on hydraulic pressure from the tandem master cylinder 42 to both circuits 18, 22).

The fluid pressure applied to the first subset of brake cylinders 38A can be greater than (and therefore unequal to) the fluid pressure applied to the second subset of brake cylinders 38B. This inequality is allowable because each subset of brake cylinders 38A, 38B provides braking to different axles 26, 30 of the vehicle 14. Further, the fluid pressure applied to the first subset of brake cylinders 38A may be adjustable relative to (yet still proportional to) the fluid pressure applied to the second subset of brake cylinders 38B to suit various scenarios.

Figure 4:
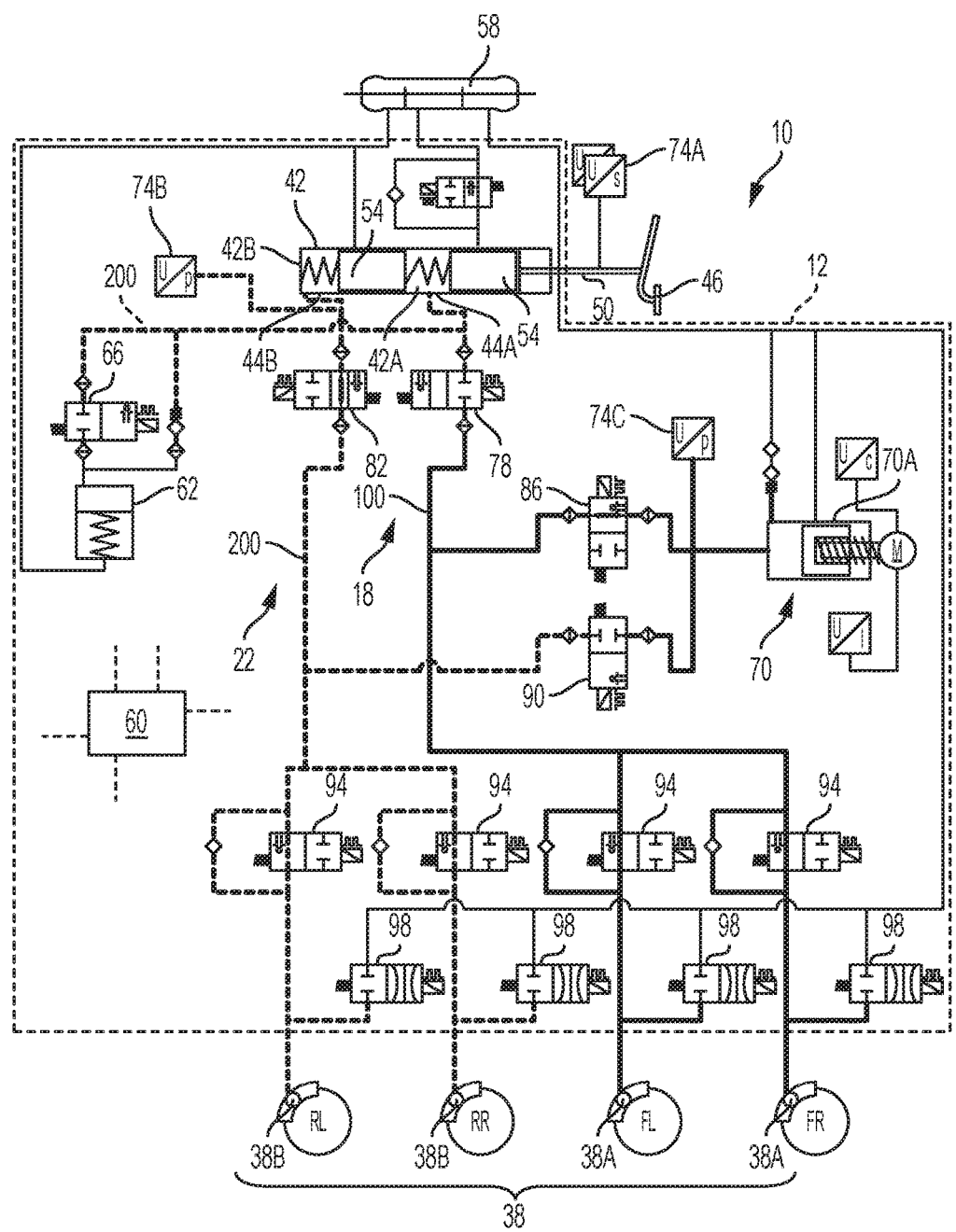
FIG. 4 schematically illustrates the vehicle brake system operating in a second mode.

In contrast to back-up braking modes that rely completely on the master cylinder to effect braking, the secondary braking mode illustrated in FIG. 4 and described above is not limited by the fluid volume of the tandem master cylinder 42. Therefore, the achievable deceleration is greater than that of a back-up braking mode which relies only on operator push-through of the master cylinder. Further, providing an additional braking force away from the tandem master cylinder 42 decreases the possibility of hard pedal issues for the operator. Further still, maintaining the push-through braking via the tandem master cylinder 42 to some of the brake cylinders 38 allows the driver to modulate and maintain control of the total vehicle braking force.

What is claimed is:
1. A vehicle brake system comprising:
a master cylinder;
a first plurality of brake cylinders provided at a first vehicle axle;
a second plurality of brake cylinders provided at a second vehicle axle;

an electronically-controlled pressure generating unit distinct from the master cylinder;
a first hydraulic circuit in selective fluid communication with the master cylinder and the first plurality of brake cylinders;
a second hydraulic circuit in selective fluid communication with the master cylinder and the second plurality of brake cylinders;
a first isolation valve in the first hydraulic circuit;
a second isolation valve in the second hydraulic circuit; and
a controller operable to receive an input;
wherein, in a first mode, the controller is operable to actuate the electronically-controlled pressure generating unit to deliver hydraulic fluid pressure to the first hydraulic circuit and separately to the second hydraulic circuit proportional to the input,
wherein, in a second mode, the controller is operable to actuate the electronically-controlled pressure generating unit to deliver hydraulic fluid pressure to the first hydraulic circuit and the first plurality of brake cylinders and the master cylinder is in communication with the second hydraulic circuit to deliver hydraulic fluid pressure to the second plurality of brake cylinders,
wherein, in the second mode, the second isolation valve is open to provide a fluid path between the master cylinder and the second plurality of brake cylinders and the first isolation valve is closed to block a fluid path between the master cylinder and the first plurality of brake cylinders.

2. The vehicle brake system of claim 1, wherein, in the second mode, the master cylinder and the electronically-controlled pressure generating unit are operable to deliver hydraulic fluid pressure to the second plurality of brake cylinders proportional to the input.

3. The vehicle brake system of claim 1, wherein the electronically-controlled pressure generating unit is a motor-driven piston.

4. The vehicle brake system of claim 1, wherein the input is a signal indicative of a user input force provided to the master cylinder via a brake pedal.

5. The vehicle brake system of claim 1, further comprising a sensor operable to provide the input to the controller, wherein the sensor is one of a pressure sensor, a pedal travel sensor, or a pedal force sensor.

6. The vehicle brake system of claim 1, further comprising a pedal feel simulator, wherein the master cylinder is in communication with the pedal feel simulator in the first mode.

7. The vehicle brake system of claim 1, further comprising:
a first control valve in the first hydraulic circuit; and
a second control valve in the second hydraulic circuit,
wherein, in the first mode, the first and second control valves open to provide a fluid path between the electronically-controlled pressure generating unit and the respective first and second brake circuits, and
wherein, in the second mode, the first control valve opens to provide a fluid path between the electronically-controlled pressure generating unit and the first brake circuit and the second control valve is closed to block a fluid path between the electronically-controlled pressure generating unit and the second plurality of brake cylinders.

8. A method of operating a vehicle brake system, the vehicle including a first plurality of brake cylinders provided at a first vehicle axle and a second plurality of brake cylinders provided at a second vehicle axle, the method comprising:
operating the vehicle brake system in a primary brake-by-wire mode in which a hydraulic pressure is applied to a first hydraulic circuit and the first plurality of brake cylinders and separately to a second hydraulic circuit and the second plurality of brake cylinders via an electronically-controlled pressure generating unit in response to depression of a brake pedal;
identifying via a controller that the vehicle brake system is inoperable in the primary brake-by-wire mode; and
subsequent to identifying that the vehicle brake system is inoperable in the primary brake-by-wire mode, operating the vehicle brake system as follows when the brake pedal is depressed:
actuating the electronically-controlled pressure generating unit via the controller to provide a first hydraulic pressure to the first plurality of brake cylinders while a fluid path between the electronically-controlled pressure generating unit and the second plurality of brake cylinders is closed; and
opening a fluid path between a master cylinder and the second plurality of brake cylinders, thereby providing a second hydraulic pressure to the second plurality of brake cylinders.

9. The method of claim 8, wherein the first hydraulic pressure is adjustable relative to the second hydraulic pressure.

10. The method of claim 8, wherein the first hydraulic pressure and the second hydraulic pressure are applied concurrently.

11. The method of claim 8, wherein the first and second hydraulic pressures are dependent upon a user input force to the brake pedal, and wherein the hydraulic pressure applied to the first plurality of brake cylinders and second plurality of brake cylinders in the primary brake-by-wire mode is a third hydraulic pressure, and wherein the third hydraulic pressure is dependent upon the user input force.

12. The method of claim 8, wherein the electronically-controlled pressure generating unit is a piston, and wherein actuating the electronically-controlled pressure generating unit further comprises actuating a motor to drive the piston to produce the first hydraulic pressure.

13. A vehicle brake system comprising:
a first plurality of brake cylinders provided at a first vehicle axle;
a second plurality of brake cylinders provided at a second vehicle axle;
an electronically-controlled pressure generating unit operable to selectively provide pressurized fluid to the first plurality of brake cylinders and the second plurality of brake cylinders;
a master cylinder operable to pressurize fluid in response to an input force;
a pedal feel simulator operable to provide a reaction force in response to the input force;
a first valve connecting the electronically-controlled pressure generating unit to the first plurality of brake cylinders;
a second valve connecting the electronically-controlled pressure generating unit to the second plurality of brake cylinders; and
a controller operable to identify an input and transition the vehicle brake system from a brake-by-wire configuration to a back-up configuration in response to the input, wherein, in the brake-by-wire configuration, the electronically-controlled pressure generating unit provides pressurized fluid to the first plurality of brake cylinders and separately to the second plurality of brake cylinders, and the master cylinder provides pressurized fluid to the pedal feel simulator, and wherein, in the back-up configuration, the electronically-controlled pressure generating unit provides pressurized fluid to the first plurality of brake cylinders, and the master cylinder provides pressurized fluid to the second plurality of brake cylinders wherein, in the brake-by-wire configuration, the electronically-controlled pressure generating unit provides pressurized fluid through the first valve to the first plurality of brake cylinders and through the second valve to the second plurality of brake cylinders, and wherein in the back-up configuration the electronically-controlled pressure generating unit provides pressurized fluid through the first valve to the first plurality of brake cylinders and the second valve is closed to prevent pressurized fluid from the electronically-controlled pressure generating unit from pressurizing the second plurality of brake cylinders.

14. The vehicle brake system of claim 13, further comprising:
a third valve and a fourth valve,
wherein in the brake-by-wire configuration the third valve is closed to prevent pressurized fluid from the master cylinder from reaching the first plurality of brake cylinders and the fourth valve is closed to prevent pressurized fluid from the master cylinder from reaching the second plurality of brake cylinders, and wherein in the back-up configuration the third valve is closed to prevent pressurized fluid from the master cylinder from reaching the first plurality of brake cylinders and the fourth valve is open to provide pressurized fluid from the master cylinder to the second plurality of brake cylinders.

15. The vehicle brake system of claim 13, further comprising a sensor operable to provide an output, wherein a pressure of the pressurized fluid from the electronically-controlled pressure generating unit is dependent upon the output of the sensor in the brake-by-wire configuration and the back-up configuration.

16. The vehicle brake system of claim 13, wherein the master cylinder is operable to receive a user input force, wherein a pressure of the pressurized fluid from the electronically-controlled pressure generating unit is dependent upon the user input force in the brake-by-wire configuration and the back-up configuration.

17. The vehicle brake system of claim 13, wherein the electronically-controlled pressure generating unit is operable to hold more fluid volume than the master cylinder.

\* \* \* \* \*